T. G. CUSHMAN.
SHOCK ABSORBER.
APPLICATION FILED MAY 23, 1911.
1,012,127.
Patented Dec. 19, 1911.
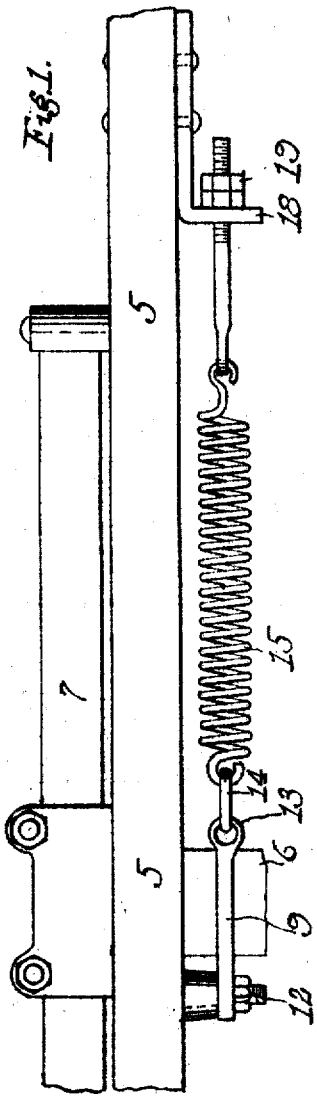
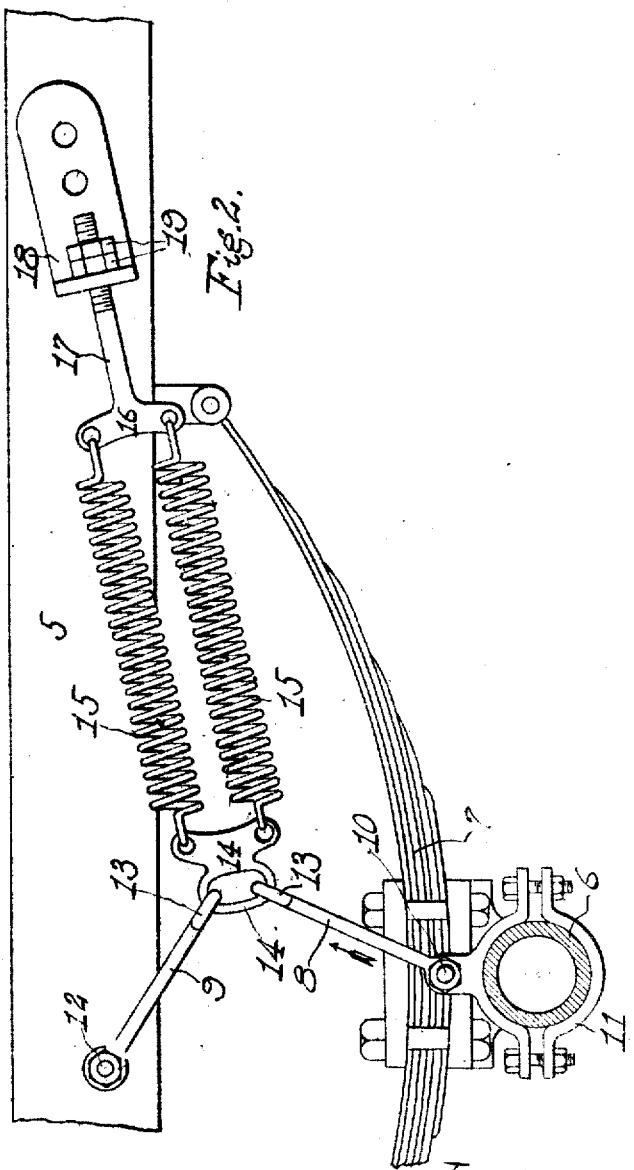

UNITED STATES PATENT OFFICE.

THOMAS G. CUSHMAN, OF SUNLAND, CALIFORNIA.

SHOCK-ABSORBER.

1,012,127.　　　　Specification of Letters Patent.　　Patented Dec. 19, 1911.

Application filed May 23, 1911. Serial No. 628,903.

*To all whom it may concern:*

Be it known that I, THOMAS G. CUSHMAN, a citizen of the United States, residing at Sunland, in the county of Los Angeles, State of California, have invented new and useful Improvements in Shock-Absorbers, of which the following is a specification.

This invention relates to a shock absorber of the spring or resilient type, being designed to absorb the rebounding energy of a vehicle by means of a resilient mechanism rather than a frictional mechanism; and the invention refers particularly to improvements in such resilient mechanisms whereby not only are the advantages of a shock absorber and an equalizer reached, but a radius mechanism is provided for the wheel axles.

I am aware that it is old to employ a spring and toggle arrangement for absorbing the shocks incident to road travel (such an arrangement being shown in my application filed August 8th, 1910, and bearing S. N. 576,244;) I do not now claim such arrangement broadly, but claim my specific arrangement, as an improvement, for accomplishing certain results unaccomplished by my former mechanism.

In its present form, my invention now consists of a pair of toggles, each toggle having one end affixed to the vehicle frame and axle, respectively, and having their other ends secured together and attached to the end of a spring or springs which resist their motion in such direction as to prevent the upward rebound of the vehicle frame and the axle; all this mechanism being arranged with such relation to the frame and the axle that an equalizer is formed which tends to hold the axle in position against any horizontal road resistance and to thereby hold the vehicle spring in correct form.

In the accompanying drawings I have shown a preferred form of my present invention, in which drawings:

Figure 1 is a plan view showing my invention in place on a typical automobile frame. Fig. 2 is a side elevation of the same.

In the drawings 5 designates the vehicle frame and 6 an axle, which axle may be either front or rear. A semi-elliptic, or any other type of, spring 7 supports the vehicle frame from the axle, being designed to prevent the transmission of shocks from the running gear to the frame. For the purposes of my present invention I use a pair of toggles connected between the frame and spring. Toggle 8 is pivotally secured at 10 to a clamp 11 which surrounds axle 6 while toggle 9 is pivotally secured at 12 to frame 5. It will be noted that point 12 is not directly above point 10, being arranged rearwardly of that point (forward being to the right in the drawings); but this is not necessarily the case. In the construction illustrated, the axle is spaced downwardly from the frame so far that the adjacent ends of the two links are somewhat below the lower edge of the frame. This makes the arrangement such that springs 15, attached between the links and frame, pull upwardly as well as horizontally. It may be conceived that a different relative position of the frame and axle, and different dimensions of the parts might cause the spring to be located differently. The ends of toggles 8 and 9 are looped as shown at 13 and engaged with a member 14 which is provided with means for engagement by the ends of springs 15. I have shown springs 15 as two in number; but they may be single or of any desired number, depending upon the service required. The other ends of the springs are engaged with a member 16 from which a bolt 17 leads to a fixture 18 secured to the side of frame 5. Nuts 19 provide for the adjustment of the position of bolt 17 and, consequently, for the adjustment of the tention of springs 15.

The general arrangement and disposition of the parts is shown in Fig. 2; and from this figure it will be seen that there is a constant tendency to pull axle 6 forwardly as well as upwardly, the forward pull being the horizontal component of the pull exerted through link 8. Consequently, the resultant of all the forces on the axle could be typically represented by the arrow shown, the greater part of this force being directed upwardly with a lesser component directed horizontally and forwardly. This is an extremely desirable arrangement as it provides for holding axle 6 to its correct position against horizontal movement when the axle has a tendency to move rearwardly under road impact, and this action keeps the vehicle spring 7 in its correct position and form; while, at the same time, the major action of the spring and toggles is to prevent the movement apart of the frame and axle. Moreover, my device does not provide an entirely rigid radius member, but does allow a certain amount of horizontal movement of the axle without any movement of the vehicle frame and this overcomes the difficulty inhering in solid radius members that such members necessarily transmit all horizontal vibrations of the axle directly to the frame. Thus I am enabled to aggregate the advantages of a radius rod with all the advantages of easy riding which a construction having no radius rod has heretofore enjoyed. And, at the same time, I have provided a device which prevents the violent upward rebounding of the frame while, at the same time, allowing perfect freedom of relative movement of axle and frame under ordinary conditions.

Having described my invention, I claim:

1. In combination with a vehicle having an axle and a frame spring supported thereon, a link pivoted at one end to the frame and extending diagonally downwardly toward the axle, another link pivoted to the axle and extending diagonally upwardly and toward the free end of the first mentioned link, and a resilient member connected to the adjacent ends of the links and connected to the frame.

2. In combination with a vehicle having an axle and a frame spring-supported thereon, a link pivoted at one end to the axle, another link pivoted at one end to the frame rearward of the pivotal attachment of the first mentioned link, the free ends of both links being adjacent each other, and a spring connected to the free ends of the links and connected to the vehicle frame, in such a manner as to exert a resilient force diagonally upwardly from the ends of the links.

3. In combination with a vehicle having an axle and a frame spring-supported thereon, a link having one end pivoted on the axle, another link having one end pivoted on the frame at a point above and rearward of the pivotal connection of the first mentioned link, the links extending forwardly and toward each other and having their other ends adjacent each other, and a spring having one end attached to the last mentioned ends of the links and having its other end adjustably secured to the frame, the arrangement being such that the force exerted by the spring acts along a line extending diagonally upwardly from the point of connection to the links and approximately at right angles to a line joining the pivotal connections of the links to the connection and frame.

In witness that I claim the foregoing I have hereunto subscribed my name this 17th day of May, 1911.

T. G. CUSHMAN.

Witnesses:
JAMES L. BRADISH,
JAMES T. BARKELEW.